May 20, 1947.   R. R. HAYS   2,420,823
HELICOPTER
Filed Oct. 16, 1943   3 Sheets-Sheet 1

Inventor
Russell R. Hays

May 20, 1947.  R. R. HAYS  2,420,823
HELICOPTER
Filed Oct. 16, 1943  3 Sheets-Sheet 2
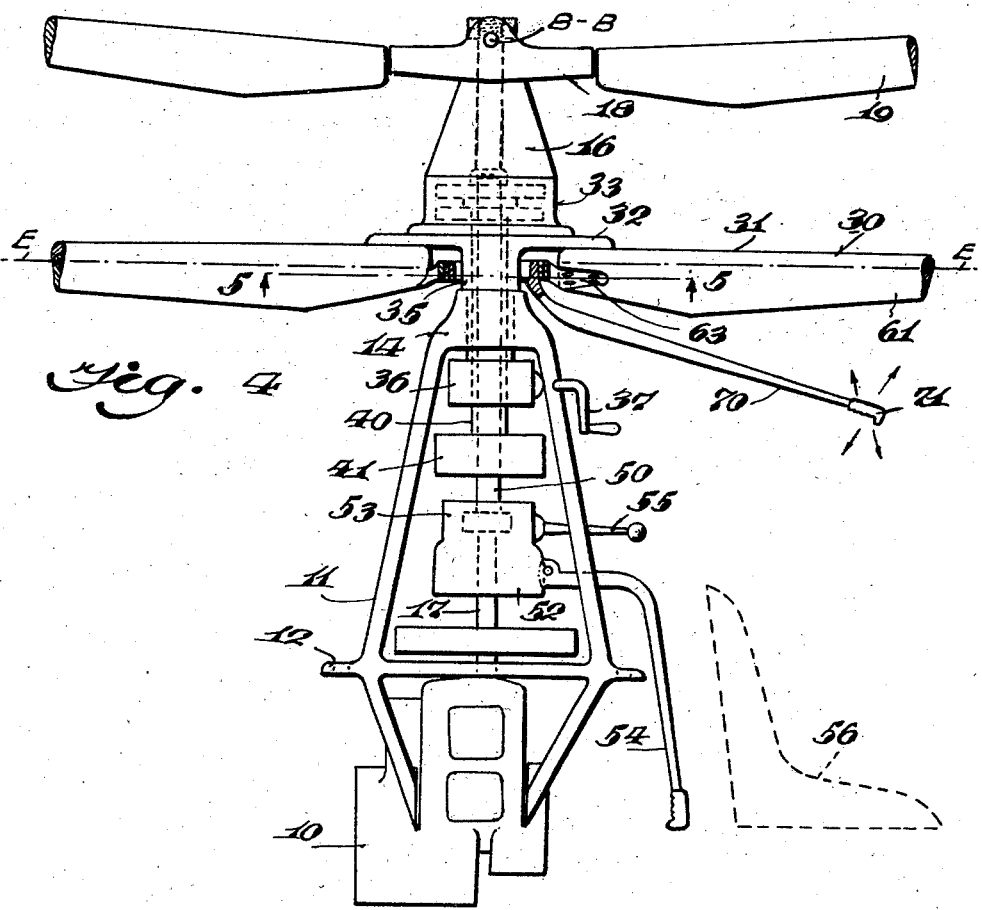
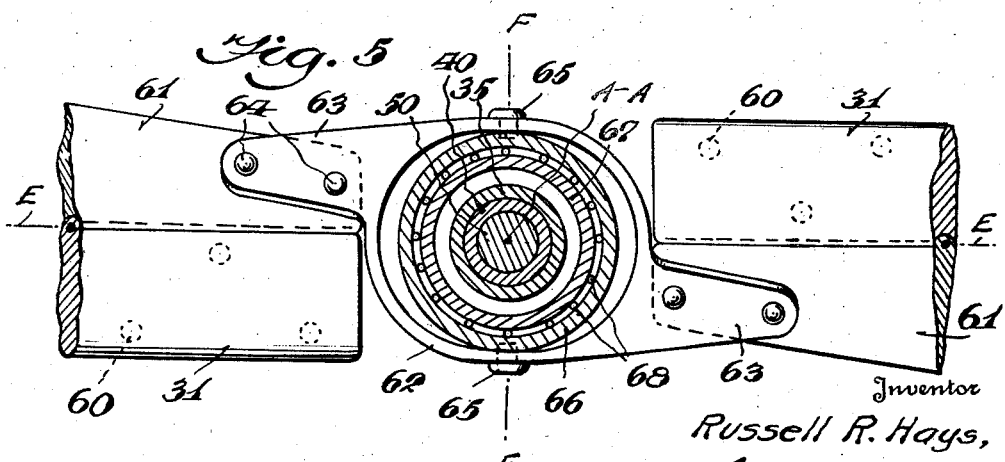
Inventor
Russell R. Hays,
By
Attorney

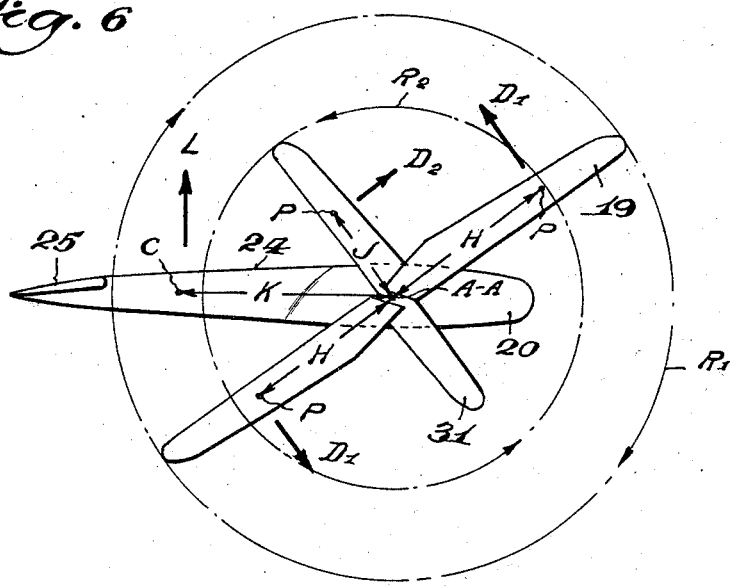
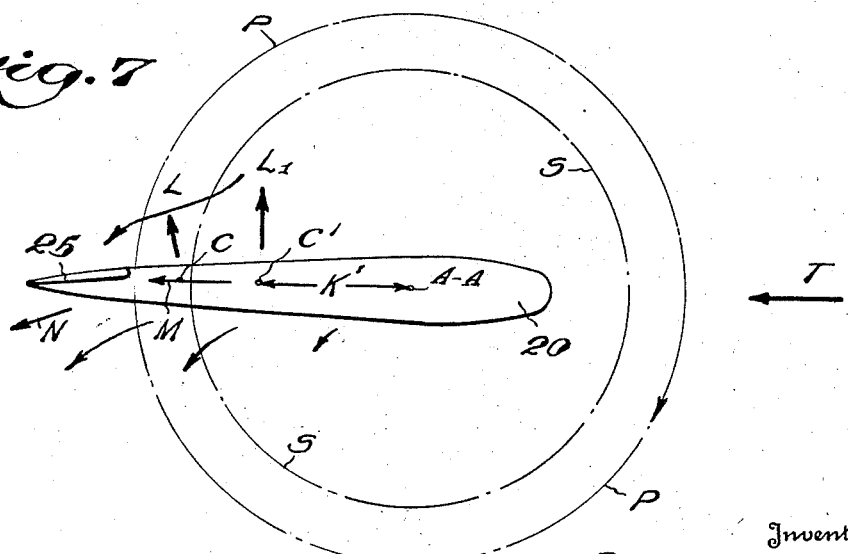

Patented May 20, 1947

2,420,823

UNITED STATES PATENT OFFICE 2,420,823

HELICOPTER

Russell R. Hays, Lawrence, Kans.

Application October 16, 1943, Serial No. 506,565

5 Claims. (Cl. 244—17)

This invention relates to helicopters and more particularly to a dual control and torque compensating means for a helicopter during its different phases of flight.

The problems attendant to transition from hovering to rapid translational flight with helicopteral machines using lifting propellers may be approached either by initially designing the machine for maximum efficiency during translational flight, with adaptations made to permit hovering flight, or by designing first of all for efficient hovering flight and then adapting to provide translational flight.

The present invention utilizes the first stated approach in incorporating the basic principle of the tail plane as used in airplane design being directly applicable to the helicopter as a means of torque compensation and control during translational flight, an early design therefor being disclosed in my prior Patent 1,977,724, with adaptation to achieve practical hovering flight. Obviously, for such adaptation both the counter torque means and the control of the preferred translational machine are no longer effective, yet the desirability of utilizing all or any of the structure essential to the translational machine if possible becomes self-evident.

The most promising structure capable for such adaptation appeared to be that of the trailing portion of the fuselage, this in line with proposals previously made to use airfoil panels radially disposed in the propeller's slipstream as a counter-torque device. Consequently if the part of the machine between the engine and the tail planes be built in the form of an airfoil set at an angle to the propeller's slipstream, a counter-torque force may be obtained at little cost in terms of structure. Such structure, however, was found to be not sufficient in itself to completely counteract the torque required to operate the propeller during hovering, nor does relative movement of it supply complete control moments. Hence, additional means of torque compensation and control are plainly called for.

Since the additional counter-torque device to be used is not essential to translational flight, it follows that minimum structure will derive from the use of an auxiliary propeller or propellers the turning of which can be discontinued after sufficient translational speed has been attained to make the machine's tail surfaces effective.

Since this auxiliary propeller should furnish also a suitable control means during hovering flight, the latter requirement simplifies the choice of propellers, experience having shown that during hovering flight a sectional feathering control leaves little to be desired. Several types are available but are not indiscriminately adaptable to the objective sought to be achieved, as investigation revealed that the adaptation presents several special problems of primary magnitude, not alone from the standpoint of control but also from the standpoint of initial torque application.

Mechanically, the transition from the use of a counter-torque propeller to a fixed panel torque-compensator with translation is not a simple matter of shifting gears as would be the case with a change in speed in an automobile. Rather, what is called for is a means of decreasing the power input to the counter-torque propeller inversely to the force acting on the panel compensator with the change from hovering to forward flight; and, a reversal of this process as forward flight is decreased to hovering. Added to this initial complexity is the need for maintaining the lift of the system substantially constant, which means that the relative speeds of the main propeller and the auxiliary propeller must be regulated with a similar degree of nicety.

That the mechanical problems thus presented can be dealt with successfully is in large part made possible through the use of a speed reduction gearing incorporating a differential between the hubs of oppositely turning co-axial propellers which equalizes their torque irrespective of their rotational speeds, in company with a brake suitable for stopping one of the propellers, disclosed in my co-pending application Serial No. 496,917, filed July 31, 1943. Such a reduction gearing-brake combination logically provides for the starting and stopping of one propeller, but does not however adequately satisfy the need for maintaining the lift of the system constant. Consequently, means such as a clutch and change-speed gear means are incorporated between the engine and the rotor head assembly in order that the ratio of the speed reduction means may be varied in accordance with the rotational speed contemplated from the counter-torque propeller.

Accordingly, as appears from the foregoing discussion, an object of this invention is broadly the provision of dual torque compensating and control means for a helicopter comprising a counter rotating propeller having a sectional control for use during hovering flight, and vertical and horizontal tail planes as a counter-torque and control means during translational flight.

Another object is the provision of relatively simple mechanism by which an auxiliary propeller co-axial with the main lifting propeller may be alternately started and stopped without greatly varying the lift on the system, and which provides a speed reduction of the engine which is greater with the auxiliary propeller stopped than when it is in operation.

A further object is the provision of a helicopter provided with counter-torque tail surfaces and having an auxiliary, co-axial lifting propeller in combination with the main lifting propeller, together with means by which the torque delivered to the auxiliary propeller can be gradually transferred to the fuselage of the supporting structure as the counter-torque tail surfaces become increasingly effective with translation.

Yet another object is the provision of a helicopter having an auxiliary co-axial torque compensating propeller mounted as described and having flaps on the trailing edges of its blades which are operated by a sectional control extending into the pilot's cabin during hovering flight, and having another set of conventional tail plane controls which are used during translational flight, at which time the auxiliary propeller is locked to the fuselage in a position providing least drag.

Still another object is the provision of an auxiliary co-axial propeller mounted for turning movement only about an axis common to a main lifting propeller which latter is mounted for free rocking movement about a horizontal axis as well as to rotate oppositely to the auxiliary propeller, as a result of which the latter gyroscopically resists tilting whereas the former does not.

Another object is the provision of an auxiliary torque compensating propeller of the type described, mounted directly above the fuselage of the system and having one blade shorter than the other, which can be locked with the shorter blade in a forward position during translational flight so that the pilot's visibility is accordingly increased.

Another object is the provision of an improved fuselage tail member having an airfoil cross-section and a control flap at its trailing edge, which is set at relatively high attack angles to the relative airstream passing over it, and having at its outer end a vertical panel also set at high attack angles to the relative airstream so that the two panels in combination form an airscoop the resultant force on which is opposed to the counter rotational tendency of a helicopter using a single lifting propeller during both hovering and translational flight.

Ancillary objects of the invention will be apparent from the following description thereof, taken with the accompanying drawings in which:

Fig. 4 is an enlarged view in side elevation of the center section of such a machine showing the relative position of the machine, sub-pylon structure, rotor head assembly, and rotor.

Fig. 5 is a section taken generally along line 5—5 of Fig. 4 and showing the sectional control means by which the flaps of the lower rotor are varied in position.

Figure 1:
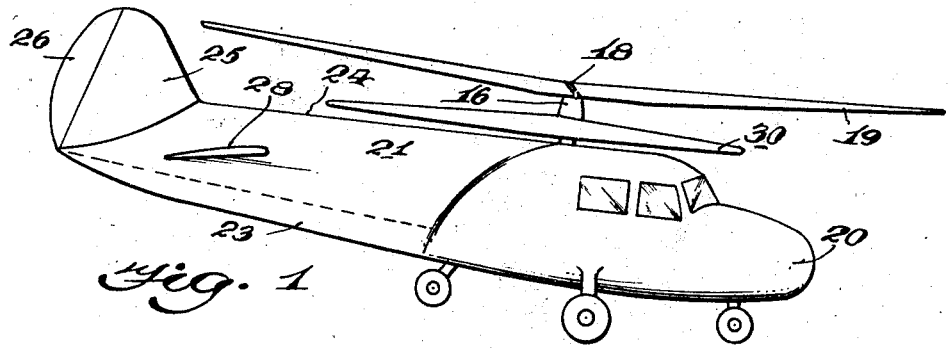
Fig. 1 is a view in side elevation of a helicopter utilizing a dual control and torque compensating means according to the invention.

Fig. 6 is a diagrammatic view in plan of a machine having dual torque means according to the invention, which illustrates the relative forces effective upon the anti-torque means during hovering flight; and Fig. 7 is a diagrammatic view in plan illustrating the deflection of the lifting propeller's slipstream through the use of torque compensating tail surfaces formed according to the invention to provide an air scoop.

Referring to the drawings, an engine 10 (Fig. 4) is mounted in a pylon structure 11 provided with securing flanges 12 by means of which it is fixed to the fuselage 20. The upper end of the pylon 11 comprises a bearing 14 for a rotor head assembly 16 aligned with the crankshaft 17 of the engine. Arranged above the head is a rotor hub of the main lifting propeller 18, the hub being mounted to provide relative rocking movement about axis B—B of the blades 19 attached thereto. Disposed between the head and the bearing 14 is a lower auxiliary propeller or rotor 30, the blades 31 of which at their butt ends are fixedly secured to a radial flange 32 provided at the base of the conical head case 33, whereby the lower propeller turns with the case. The rotor head assembly 16 which is preferably of the type disclosed in my co-pending application Serial No. 496,917, filed July 31, 1943, incorporates a double set of planetary gearing carried in the lower end of the head case 33 and having a differential means intermediate them so that power applied to the sun gear of one set of planetaries by the crankshaft 17 acts to reduce the engine speed and to turn the case 33 in opposite direction and with a torque equal to that applied to the hub of rotor 18 carried on a stub shaft mounted in the upper end of the head case and turning with the other set of planetaries.

The lower end of the head case 33 is fixed to an outer shaft 35 concentric with shaft 17 and carried by the bearing 14, the lower end of the shaft 35 being fitted with a friction brake 36, adapted to be operated by the hand crank 37. The sun gear of the other set of planetary gears is mounted on a shaft 40 concentric with shafts 17 and 35 which extends to a free-wheeling unit 41 which locks the sun gear of the set against rotation when a torque is applied by the driveshaft 17 but turns to permit the rotors to autorotate in event of engine failure. As the drive and head assembly described corresponds to that of my prior application aforesaid, detailed illustration here is not believed to be necessary.

Carried directly beneath the free-wheeling unit 41 is a clutch and gear shift unit 52—55 incorporated in the power transmission line, i. e., between crank shaft 17 and a coaxial shaft 50 driven thereby. This unit operates generally as does a similar unit in an automobile, with the exception that the unit gears serve only to increase the shaft speeds imparted to the head case 33 and are utilized for this purpose only when the auxiliary propeller 30 turning with the head 16 has been released for rotation by means of the brake 36. As in an automobile, the unit clutch 52 is operated by a handle 54 extending to one side of the pilot's seat 56 and the change-speed gears 53 are shifted by means of a handle 55 which extends out and above the pilot's shoulder where it can be reached simultaneously by his other hand.

The blades 31 of the lower rotor 30 being fixedly secured to the flange 32 of the head assembly 16 as by bolts 60 comprise a rigid propeller. The blades thereof have trailing edge flaps 61, Fig. 5, mounted on aligned pivots having the common axis E—E which passes through the rotor center A—A. A collar 62 disposed about the outer shaft 35 is provided with oppositely and symmetrically disposed projections 63 to which the flaps are affixed as by rivets or bolts 64. Consequently, the collar is free to rock about the axis E—E thereby moving the flaps oppositely and varying the effective pitch of the respective blades by an equivalent degree. The collar carries aligned pins 65 disposed on an axis F—F at right angles to and intersecting the axis E—E at the rotor center A—A. An outer ball race 66, which with an inner ball race 67 and bearings 68 comprise a combination annular and thrust bearing, is pivotally mounted on pins 65 and the inner ball race 67 has affixed to it a control arm 70 with a handle 71 extending out and above the pilot's head where it can be easily reached.

It will be evident that, due to above described arrangement and mounting, movement of the control handle 71 in any direction has the effect of tilting the collar 62 in the opposite direction by reason of the associated pivots E—E and F—F comprising a universal joint symmetrical to the shaft axis A—A. Thus if the handle 71 be pushed upward a flap 61 is pushed downward at trailing phases of rotation and upward at forward phases of rotation, thereby increasing the attack angle of the rear blade and decreasing the attack angle of the forward blade to provide a forward pitching moment as is well known in the art. The same action applies to rolling moments. Due to the precessional moment of a rigid propeller the pilot will not push the handle 71 directly toward the direction of action of the control moment desired, but will anticipate this moment by some 60° in his movement of the control column 70.

Figure 2:
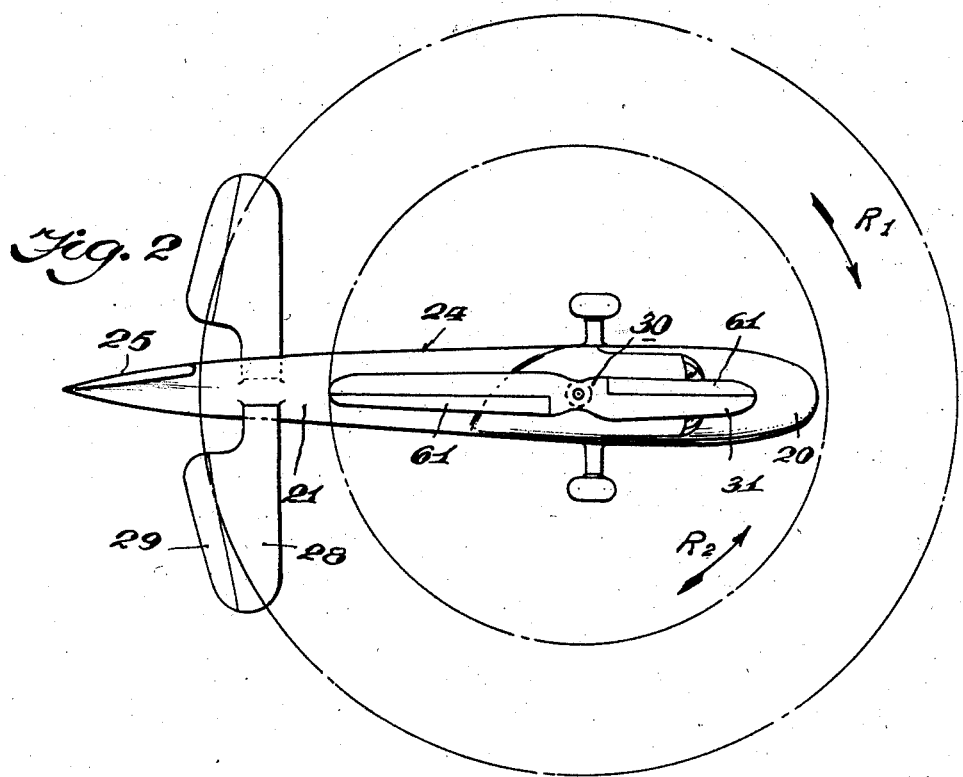
Figs. 2 and 3 are plan and front elevational views, respectively, of the machine illustrated in Fig. 1.
Figure 3:
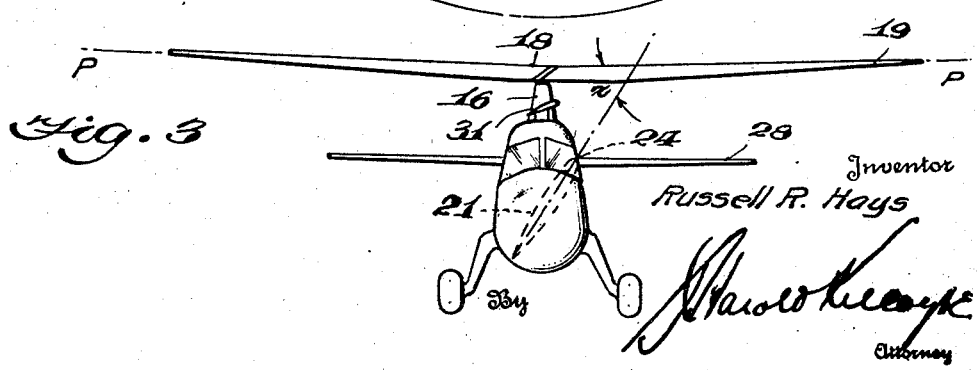

Considering now the anti-torque construction of fuselage, the tail end 21 of the fuselage 20 is built in the form of a thick section vane or airfoil which tapers slightly as it extends rearwardly. As shown in dotted lines (Fig. 3), the chord line of this airfoil is set at an angle X to the plane of rotation P—P of the main propeller 18, with the leading edge 24 of the airfoil extending rotational when viewed from above. The angle X and hence the attack angle of the tail section may be as great as 45° to the vertical, the magnitude of this attack angle to the slipstream of the lifting propeller 18 having been arrived at through free flight tests of models having a single radially disposed counter-torque vane of this general character, which indicated that stability of the system was intimately associated with the use of such high attack angles. It was moreover found that the use of a vertical tail surface 25 shown in elevation and plan (Figs. 1 and 2) and set at an equally high attack angle to the longitudinal axis of the fuselage and extending upward from the anti-torque vane 21 greatly enhanced its effectiveness.

While it would appear that the use of an auxiliary counter-torque propeller 30 would permit a decrease in the magnitude of the angles desired on the tail surfaces, such would not necessarily be the case; it being apparent that the combination of the high angularity and scoop-like character of the combined longitudinal and vertical airfoils provides attributes not commonly associated with the use of this type of anti-torque devices. These attributes arise by reason of the fact that airfoils set at a high angle and transverse to an airstream S—S of circular cross-section have the effect of creating a transverse movement M, Fig. 7, of the deflected airstream, this being particularly noticeable when double curvature sections are used. This transverse flow M being in turn deflected by the associated vertical fin 25, the resultant air movement is in the direction N when viewed from above and hence is directly opposed to the rotational component of the slipstream S—S. That such transverse and counter-rotational deflection of the slipstream S—S should cause the center of pressure C' on the counter-torque airfoil 21 to move outwardly to the position C logically follows. Hence the effectiveness of the tail surfaces even during hovering flight is increased through increase in the moment arm K through which the counter rotational force L now acts.

During hovering flight the dominant direction of the slipstream S—S is downward. However, with a comparatively small amount of translational travel the resultant airstream T acts to deflect the slipstream rearwardly which serves to further shift the airfoil's center of pressure C rearwardly as well as to increase the magnitude of the force L through the increased velocity of the mean airstream. With translation of any magnitude the force L consequently becomes sufficient to completely counter-act the torque required to turn the lifting propeller 18. When the force L becomes greater than the torque needed to drive the lifting propeller 18, flaps 26 and 23 (Figs. 1 and 2), provided on the vertical tail surface 25, and the fuselage tail 21, respectively, are operated in the same fashion as a conventional rudder to prevent turning of the machine. Horizontal stabilizers 28, having flaps 29, are also provided at the end of the fuselage tail 21, the flaps being connected by cables (not shown) with a conventional control column or stick so that back and forth movement of the stick suffices to provide pitching moments and side to side movement rolling moments all in the direction of movement of the stick as is well known in the art.

Having considered the operation of the respective anti-torque means and associated controls individually, consideration is now given to their interaction during the transition from hovering to translation flight. To begin with, the engine having been started, but the brake 36 set so that the rotors are not turning, the brake is released, the gear shift lever 55 thrown to give a minimum speed reduction between the drive or crank shaft 17 and the coaxial driven shaft 50 extending to the rotor head assembly 16, and the clutch 52 thrown in to start both rotors turning. Since the lower auxiliary rotor 30 is smaller than the main rotor 18 it follows that if unchecked it would build up speed until the torque absorbed by it equals that absorbed by the larger propeller 18.

However, with creation of a slipstream S—S by the lifting propellers the fuselage panel 21 now becomes effective in creating a force L opposed to the drag of the main propeller 18. Consequently, the torque applied to the auxiliary propeller no longer needs to equal that applied to the main propeller in order to balance the torque forces effective upon the system. Since any torque unbalance in the system is indicated by a tendency of the fuselage to rotate about the propeller axis of rotation A—A, it becomes comparatively simple for the pilot to turn the brake handle 37 until the friction between the propeller 30 and the fuselage 20 is substantially equal to the force L times the distance K as shown in Fig. 6. The brake 36 thus provides an easily variable means of transmitting the torque applied to the lower rotor 30 to the fuselage and torque balance of the system now results when the drag of the main propeller D₁ times the distance H from the propeller center A—A to the blades' center of percussion P, is equal to D₂J plus LK.

Assuming that such torque balance is operative at the time the machine leaves the ground, the pilot now maintains control during hovering flight through use of the sectional control arm 70 and by use of a rudder bar operating the torque panel flaps 23, 26. Translation being desired, he pulls down on arm 70 to produce a forward pitching moment on the auxiliary propeller 30 thus causing the system to move forward as is well known in the art. Such movement makes the tail vanes 21 and 25 more effective, hence further tightening of the brake 36 is required to prevent turning of the machine. This acts to speed up the main propeller 18 but chokes down the engine so that it now becomes necessary for the pilot to quickly throw the gears of the change-speed unit 53 to provide a greater speed reduction between the engine 10 and the rotor head assembly 16.

As further translational speed is attained the force L on the tail vanes suffices wholly to equal D₁H and simultaneously the conventional stick control to the flaps 29 becomes operative in the usual manner. Consequently, the pilot now shifts gears again and proceeds to tighten the brake 36 until the auxiliary propeller 31 is locked against rotation. By proper manipulation of the brake, it is possible to lock the auxiliary propeller in a position in which it aligns with the direction of travel, and so that its shorter end extends forwardly thereby to increase the pilot's visibility.

The transition from translational to hovering flight is but a reversal of this outlined procedure and hence no detailed description thereof appears to be necessary.

To simplify the movements required by the pilot of machines employing the dual control and torque compensating means of the present invention, an automatic gear shift may be substituted for the change speed-clutch unit 52—55. According to such advanced design as contemplated, the pilot will be required only to operate the brake and the sectional control levers in addition to the conventional control stick, and hence his manual operations for the precise control and advantages of torque compensation provided for all phases of flight are relatively limited.

As many changes could be made in carrying out the above constructions without departing from the scope of the invention, it is intended that all matter contained in the above description or shown in the accompanying drawings shall be interpreted as illustrative and not in a limiting sense.

I claim:

1. Counter-torque means for the lifting rotor of a helicopter, comprising in combination with a counter-torque panel mounted on the fuselage of said helicopter, a horizontally disposed counter-torque propeller mounted above said fuselage, and means including a brake for said propeller and variable speed transmission intermediate said propeller and said rotor for varying the rate of rotation of said propeller from zero rotation to a rotational speed absorbing a substantial portion of the driving torque of the engine of said helicopter during varying phases of flight.

2. Counter-torque means for the lifting rotor of a helicopter, comprising in combination with a vertically disposed counter-torque panel mounted on the fuselage of said helicopter, a horizontally disposed counter-torque lifting propeller mounted above said fuselage, and means including a brake for said propeller and variable speed transmission intermediate said propeller and said rotor for slowing the rate of rotation of said propeller during translational flight from a rotational speed absorbing a substantial portion of the driving torque of the engine of said helicopter to zero rotation and simultaneously increasing the rate of rotation of said rotor to a rotational speed absorbing all of the driving torque of said engine, whereby the speed of translational flight is increased.

3. Counter-torque means for the lifting rotor of a helicopter, comprising in combination with a counter-torque panel mounted on the fuselage of said helicopter, a horizontally disposed counter-torque lifting propeller mounted above said fuselage in co-axial relation to said lifting rotor, and means including a brake for said propeller and variable speed transmission intermediate said propeller and said rotor for starting and stopping said counter-torque propeller during varying phases of flight while maintaining the lift of said helicopter substantially constant.

4. Counter-torque means for the lifting rotor of a helicopter, including a contra-rotating lifting propeller mounted on a hub co-axially disposed below the hub of said rotor and above the fuselage of said helicopter, a brake for said propeller, variable speed transmission intermediate said propeller and said rotor, and different length blades for said propeller to render it directionally stable with respect to said hub when locked by said brake with the shorter of said propeller blades extending into the direction of translation of said helicopter.

5. Control means for a helicopter, including the hub of a lifting propeller, propeller blades rigidly mounted upon said hub, trailing edge flaps articulatively mounted upon aligned hinge axes carried by opposite blades of said propeller, a universally mounted control member mounted on said hub in operative relation with said flaps and having one axis synonymous with said aligned hinge axes carried by said blades, and a control handle mounted on a slip ring carried by said control member whereby movement of said handle imposes a cyclic variation in the position of said flaps with respect to said blades to provide a sectional control for said propeller.

RUSSELL R. HAYS.

REFERENCES CITED

The following references are of record in the file of this patent:

UNITED STATES PATENTS

| Number | Name | Date |
|---|---|---|
| 2,338,935 | Hafner | Jan. 11, 1944 |
| 1,977,724 | Hays | Oct. 23, 1934 |
| 1,455,352 | Overbeek | May 15, 1923 |
| 1,527,666 | Berliner | Feb. 24, 1925 |
| 1,541,534 | Souder | June 9, 1924 |
| 2,037,745 | Vaughn | Apr. 21, 1936 |
| 1,449,129 | Pescara | Mar. 20, 1923 |
| 1,836,406 | Smith | Dec. 15, 1931 |
| 2,364,096 | Platt | Dec. 5, 1944 |
| 2,369,652 | Avery | Feb. 20, 1945 |

FOREIGN PATENTS

| Number | Country | Date |
|---|---|---|
| 536,904 | Great Britain | May 30, 1941 |